No. 683,838. Patented Oct. 1, 1901.
P. BEST.
TURN TABLE FOR INCLINED TRACKS.
(Application filed Feb. 7, 1901.)
(No Model.)
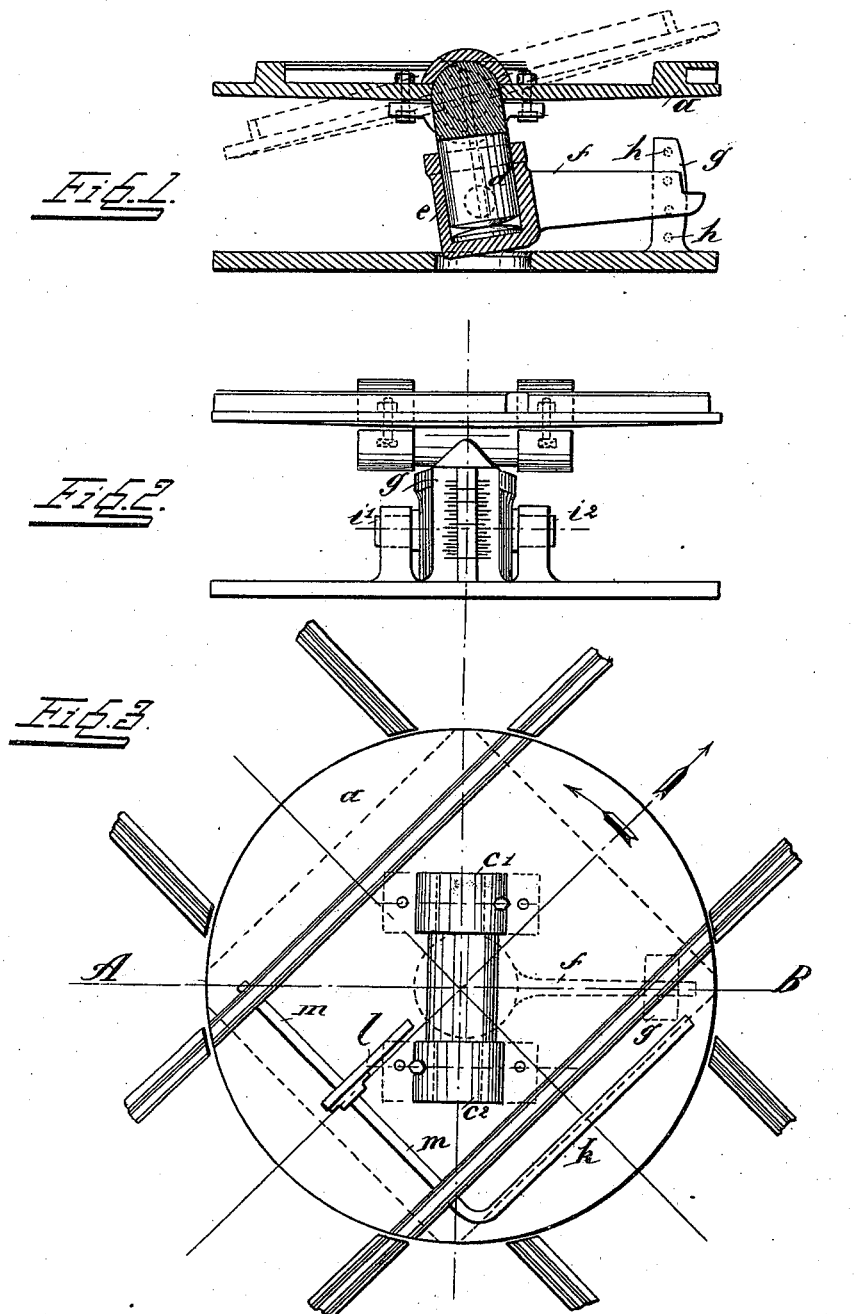

UNITED STATES PATENT OFFICE.

PAUL BEST, OF BOCHUM, GERMANY.

TURN-TABLE FOR INCLINED TRACKS.

SPECIFICATION forming part of Letters Patent No. 683,838, dated October 1, 1901.

Application filed February 7, 1901. Serial No. 46,369. (No model.)

*To all whom it may concern:*

Be it known that I, PAUL BEST, a subject of the German Emperor, and a resident of Bochum, Germany, have invented certain new and useful Improvements in Turn-Tables for Inclined Tracks, of which the following is a specification.

My present invention relates to turn-tables, the object being to provide an adjustable turn-table adapted to be adjusted to any desired incline for the purpose of bringing trucks or cars from inclined tracks to horizontal tracks extending at right angles to said inclines, and vice versa.

With this object in view the invention consists of the construction and novel combination of parts fully described and claimed hereinafter.

In the accompanying drawings, Figure 1 is a vertical central sectional view on line A B, Fig. 3, of the adjustable turn-table. Fig. 2 is an elevation of same looking from the right to the left in Fig. 3. Fig. 3 is a top plan view of the turn-table.

Referring to the drawings, $a$ represents the turn-table, provided with two bearings made in one piece therewith and the axis of which is at an angle of forty-five degrees with the direction of the rails. Said bearings receive two pivot-pins $c'$ $c^2$, adapted to be locked in said bearings and arranged at right angles to the main pivot made one with said pivot-pins. Said pivot $d$ is journaled in a socket $e$, provided with an integral lever $f$ and having a curved bottom bearing-plate. The lever $f$ extends through the guide-piece $g$, provided with a scale indicating the most usual inclines from any convenient number of degrees, as from zero to twenty-five degrees. Said guide-piece $g$ is provided with two lateral adjusting-screws $h$, serving to hold the lever $f$ in adjusted positions, whereby the socket $e$, adapted to rotate on the pivot-pieces $i'$ $i^2$, is also held in a given inclined position. When after unlocking the pivot-pieces $c'$ $c^2$ in their bearings the turn-table is brought in line with the horizontal track-rails and when said pivot-pieces are again locked in their bearings the turn-table has but to be rotated to an angle of ninety degrees to bring its track-sections in line with the inclined tracks.

The trucks or cars are locked on the turn-table by means of an arm $l$, adapted to engage the axle thereof and engaging a recess in the upper face of the turn-table. Said arm $l$ is secured to a horizontal shaft $m$, adapted to be rotated by means of a lever $k$ to bring the arm $l$ in vertical or horizontal positions.

Having fully described my invention, what I claim, and desire to secure by Letters Patent, is—

1. In an adjustable turn-table for inclined tracks, the combination with the turn-table proper and bearings carried by said turn-table and the axis of which extends at an angle of forty-five degrees to the direction of the rails of a vertical pivot, two horizontally-projecting pivots carried by the vertical pivot and journaled in said bearings, an adjustable bearing-socket receiving said vertical pivot, and means for adjusting said bearing-socket, substantially as described.

2. In an adjustable turn-table for inclined tracks, the combination with the turn-table proper and bearings carried by said turn-table and the axis of which extends at an angle of forty-five degrees to the direction of the rails, of a vertical pivot, two horizontally-projecting pivots carried by the vertical pivot and journaled in said bearings, an adjustable bearing-socket receiving said vertical pivot, an integral lever in said adjustable socket, a slotted guide-piece through which extends said lever, a scale of inclines on said guide-piece, and means for holding the lever in adjusted positions in said guide-piece, substantially as described.

3. In an adjustable turn-table for inclined tracks, the combination with the turn-table proper and bearings carried by said turn-table and the axis of which extends at an angle of forty-five degrees to the direction of the rails, of a vertical pivot, two horizontally-projecting pivots carried by the vertical pivot and journaled in said bearings, an adjustable bearing-socket receiving said vertical pivot, an integral lever in said adjustable socket, a slotted guide-piece through which extends said lever, a scale of inclines on said guide-piece, and means for holding the lever in adjusted positions in said guide-piece, and means for locking the trucks or cars on the turn-table, substantially as set forth.

4. In an adjustable turn-table for inclined tracks, the combination with the turn-table proper and bearings carried by said turn-table and the axis of which extends at an angle of forty-five degrees to the direction of the rails, of a vertical pivot, two horizontally-projecting pivots carried by the vertical pivots and journaled in said bearings, an adjustable bearing-socket receiving said vertical pivot, an integral lever in said adjustable socket, a slotted guide-piece through which extends said lever, a scale of inclines on said guide-piece, and means for holding the lever in adjusted positions in said guide-piece, a lever-arm, a horizontal shaft carrying said lever-arm and journaled on the upper face of the turn-table, and means for rotating said shaft, substantially as set forth.

In testimony whereof I have hereunto set my hand in presence of two witnesses.

PAUL BEST.

Witnesses:
CHARLES L. SIMPLE,
KARL SCHMIDT.